(12) United States Patent
McDowell et al.

(10) Patent No.: US 7,039,366 B1
(45) Date of Patent: May 2, 2006

(54) ANTENNA AND ACCESS POINT MOUNTING SYSTEM AND METHOD

(75) Inventors: John E. McDowell, Waterford, MS (US); Clark E. Hinds, Bartlett, TN (US); John L. Fleskes, Arlington, TN (US)

(73) Assignee: Cetacea Sound, Inc., Memphis, TN (US)

( * ) Notice: Subject to any disclaimer, the term of this patent is extended or adjusted under 35 U.S.C. 154(b) by 128 days.

(21) Appl. No.: 10/816,381

(22) Filed: Apr. 1, 2004

(51) Int. Cl.
*H04B 1/38* (2006.01)
*H04Q 7/20* (2006.01)

(52) U.S. Cl. .................... 455/90.3; 455/562.1
(58) Field of Classification Search ............ 455/562.1, 455/90.3, 73, 77, 83
See application file for complete search history.

(56) References Cited

U.S. PATENT DOCUMENTS

| | | | |
|---|---|---|---|
| 5,276,277 A | 1/1994 | Hightower et al. | 174/35 MS |
| 5,496,966 A | 3/1996 | Hightower et al. | 174/35 MS |
| 5,619,217 A | 4/1997 | Mailandt et al. | 343/872 |
| 5,777,583 A | 7/1998 | Canora et al. | 343/700 MS |
| 6,222,503 B1 | 4/2001 | Gietema et al. | 343/890 |
| 6,249,671 B1* | 6/2001 | Tucker et al. | 455/90.3 |
| 6,307,525 B1 | 10/2001 | Bateman et al. | 343/853 |
| 6,369,766 B1 | 4/2002 | Strickland et al. | 343/713 |
| 6,963,305 B1* | 11/2005 | Knapp | 342/367 |
| 2002/0142149 A1* | 10/2002 | Nakashima et al. | 428/323 |
| 2005/0152337 A1* | 7/2005 | Wurtzel et al. | 370/352 |
| 2005/0206569 A1* | 9/2005 | Arndt et al. | 343/700 MS |
| 2005/0245254 A1* | 11/2005 | Hall | 455/426.1 |

* cited by examiner

*Primary Examiner*—Wilson Lee
*Assistant Examiner*—Angela M Lie
(74) *Attorney, Agent, or Firm*—Walker, McKenzie & Walker, P.C.

(57) ABSTRACT

A mounting system and method for an antenna and access point of a wireless local area network communication system. The antenna and access point are mounted on top of a board member, and a protective cover is mounted on board member over the antenna. The board member can then be placed on a support surface such as the top of a suspended ceiling and the access point connected to the input cabling of the local area network communication system. The board member can then freely moved around to fine-tune the area of coverage of the access point.

1 Claim, 2 Drawing Sheets

ANTENNA AND ACCESS POINT MOUNTING SYSTEM AND METHOD

BACKGROUND OF THE INVENTION

1. Field of the Invention

The present invention relates, in general, to an antenna and access point mounting system and method for mounting an access point above a ceiling or on a wall surface of a building, and in particular, to such a system and method that includes a cover for protecting the antenna and supporting the antenna coaxial cables, and a freely movably mounting base plate for allowing the coverage area of the access point to be easily fine-tuned.

2. Background Art

With the advent of wireless LAN (local area networks) communication systems operating in the 2.4 GHz (gigahertz) range, which have been developed for both outdoor use, as well as indoor use in homes, office buildings and industrial complexes, the need for easily installed unitized antennas and access points has increased. In the 2.4 GHz range, coaxial cable length becomes a factor as the longer the coaxial cable becomes, the more signal loss incurred. While the individual antenna technology and the individual access point technology exist, the need for antenna and access point mounting systems remain.

The typical installation of wireless LAN 2.4 GHz GSM (Global System for Mobile Communications) access point transceivers involves the placement of the access point and its antenna in an area to give the desired radio frequency coverage in the specific area. Many aftermarket antennas require separate mounting with longer coaxial cable runs and no firmly established mounting methodologies exit.

The ambiguity of mounting and installation methodologies results in radio frequency coverage less than desired or less than specified system parameters.

Some antenna designs are inherently fragile and in order to minimize the possibility of damage, a protective cover is installed over the antenna. This cover protects the antenna coaxial cables from lateral stress and shock that could cause antenna circuit board failure.

In the past, access points and their antennas were mounted in fixed locations and did not lend themselves to relocation in order to fine-tune an area of coverage.

Today, there are antenna technologies that embed antennas into or onto ceiling tiles. While this is certainly one method of attachment, the first is difficult, if not impossible to match ceiling tiles to a building or structure that has been erected and occupied for some time. Ceiling tiles discolor and cannot be matched. Furthermore, they are difficult to remove and relocate to another location for the purpose of fine-tuning a coverage area. The solution of penetrating the ceiling tile and mounting the antenna to the outside of the ceiling tile is another workable solution, but is time consuming, and messy especially if done at the customer location and again does not lend itself to easy relocation.

In a typical wireless LAN configuration, a transmitter/receiver (transceiver) device, called an access point or access point transceiver, connects to a wired network from a fixed location using standard input cabling. The access point receives, temporary stores, and then transmits data between the wireless LAN and the wired network infrastructure. The access point (or the antenna attached to the access point) is usually mounted high, but may be mounted essentially anywhere that is practical as long as the desired area of coverage is obtained.

A preliminary patentability search conducted in class 343, subclasses 713, 773, 890, 878, and 720 produced the following patents which appear to be relevant to the present invention: Hightower et al., U.S. Pat. No. 5,276,277, issued Jan. 4, 1994; Hightower et al., U.S. Pat. No. 5,496,966, issued Mar. 5, 1996; Mailandt et al., U.S. Pat. No. 5,619,217, issued Apr. 8, 1997; Canora et al., U.S. Pat. No. 5,777,583, issued Jul. 7, 1998; Gietema et al., U.S. Pat. No. 6,222,503, issued Apr. 24, 2001; Bateman et al., U.S. Pat. No. 6,307,525, issued Oct. 23, 2001; and Stickland et al., U.S. Pat. No. 6,369,766, issued Apr. 9, 2002.

Nothing in the known prior art, either singly or in combination, discloses or suggests the present invention.

BRIEF SUMMARY OF THE INVENTION

In accordance with the present invention, an improved antenna/access point transceiver mounting system and method for installation above ceilings or on surface walls of a building is provided. The antenna/access point transceiver mounting assembly includes a base plate and a cover for the protection of the radio frequency antenna and antenna coaxial cable assemblies which are enclosed in a cavity provided by the cover. The antenna cable assemblies are terminated with the appropriate connectors for connecting the antenna assembly to the access point transceiver. The base plate has a plurality of openings by which various access points are mounted and/or wall brackets are attached.

DETAILED DESCRIPTION OF THE INVENTION

Figure 1:
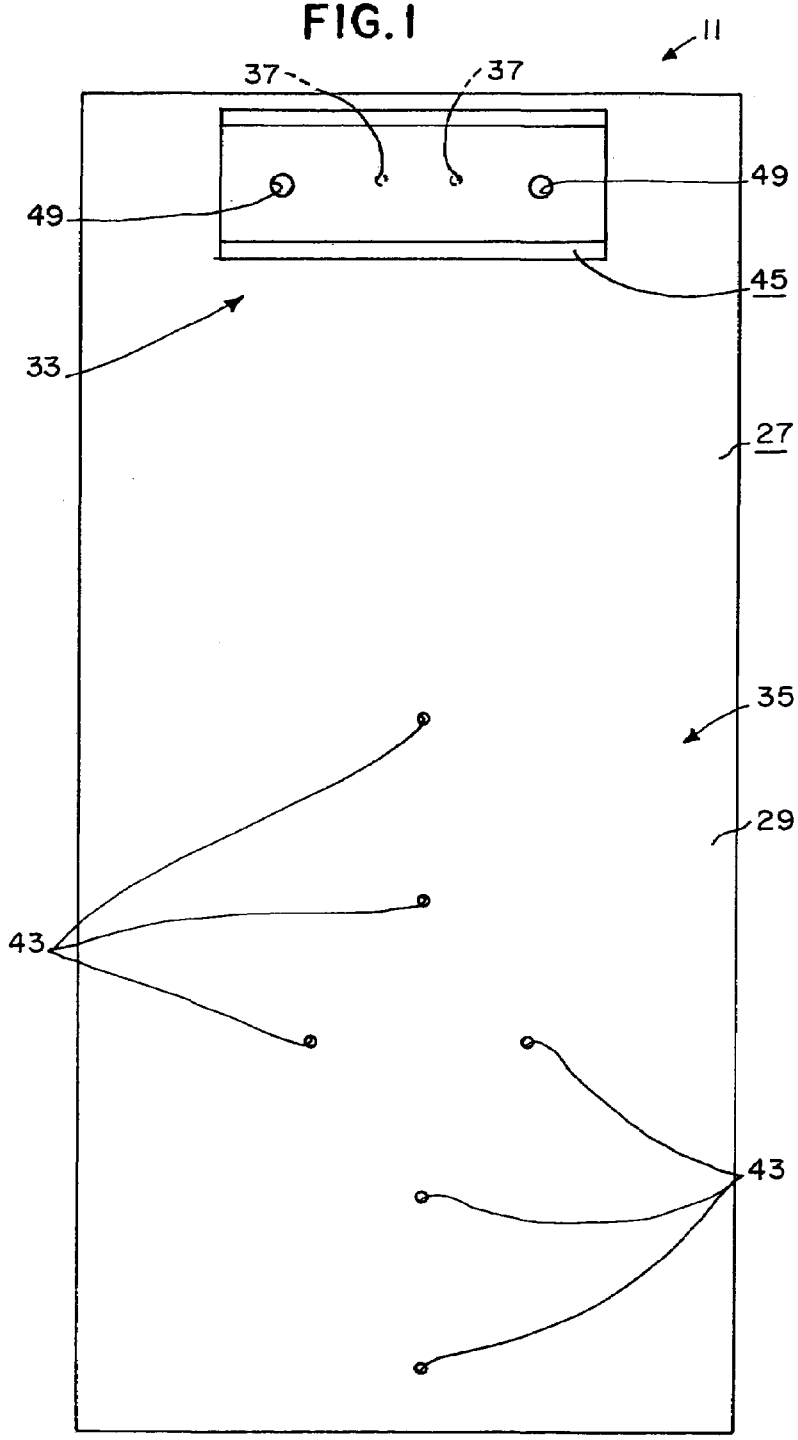
FIG. 1 is a top plan view of the mounting system of the present invention.
Figure 2:
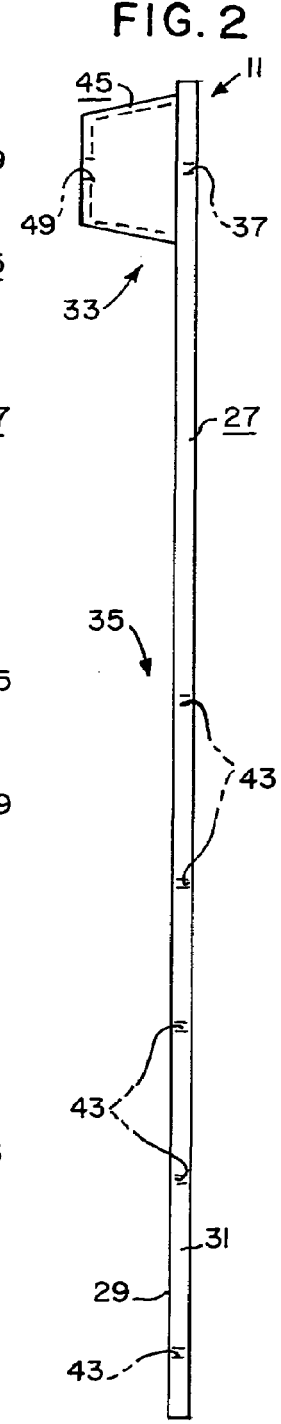
FIG. 2 is a side elevational view of FIG. 1.
Figure 3:
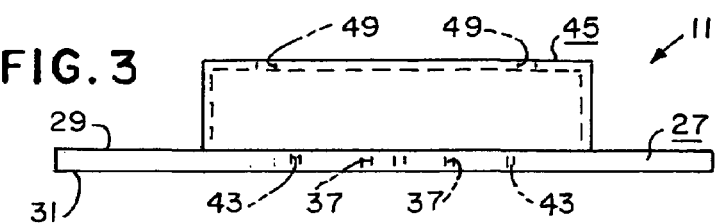
FIG. 3 is an end elevational view of FIG. 1.
Figure 4:
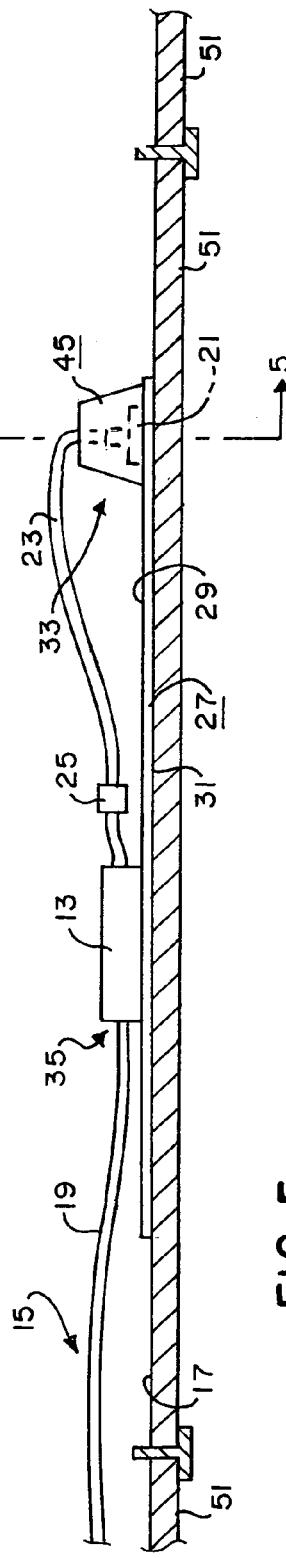
FIG. 4 is a side elevational view of the mounting system of the present invention combined with an access point transceiver and antenna of a wireless local area network communication system and placed on top of a suspended ceiling.
Figure 5:
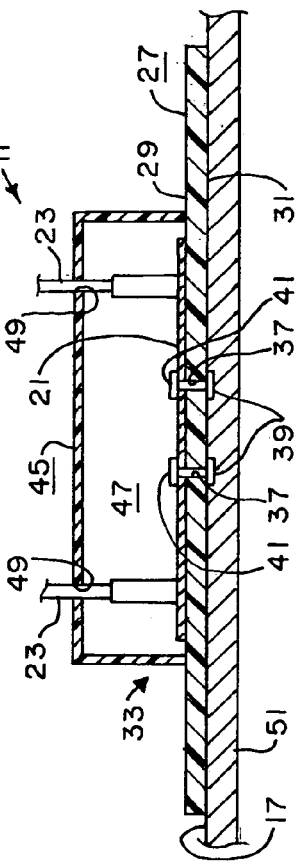
FIG. 5 is a sectional view substantially as taken on line 5—5 of FIG. 4.

The mounting system of the present invention is shown in FIGS. 1–6, and identified by the numeral 11. The method and mounting system 11 of the present invention are used for mounting and fine-tuning the coverage area of an access point transceiver (access point) 13 of a wireless local area network communication system 15 on a support surface 17 such as the top of a suspended ceiling, etc. The wireless local area network communication system 15 may be of any typical configuration, having coaxial input cabling 19, etc.

The access point 13 may be of various well known types and models desired by the user such as, for example, a Cisco model Aironet 1200 Series access point transmitter by Cisco Systems, Inc., 170 West Tasman Dr., San Jose, Calif. 95134.

The antenna 21 may also be of various well known types and models desired by the user such as, for example, a 3 dpi peak gain, diversity, stipline antenna, model Microsphere CAF94165101 by Centurion Wireless Technologies, Inc., 3425 North 44th Street, Lincoln, Nebr. 68501. The antenna 21 typically includes antenna coaxial cabling 23 for connection to the access point 13. The antenna coaxial cabling 23 may be reduced in length and terminated with appropriate coaxial cable connectors 25 for connection to the access point 13. Any protective cover or radome provided with the antenna 21 is removed and discarded.

The mounting system 11 includes a freely movably board member 27 having a top surface 29 and a bottom surface 31. The board member 27 is preferably radio wave transparent. The phrase "radio wave transparent" is used herein to mean or refer to a material that does not block radio waves. Thus, the board member 27 is preferably constructed out of a plastic bearing substrate such as ABS (acrylonitrile butadiene styrene) or PVC (polyvinyl chloride), or a flourocarbon resin such as Teflon®. The specific shape and size of the board member 27 may vary, but typically consist of a plate-like rectangle having planar and parallel top and bottom surfaces 29, 31, with a length of 18 inches (45.72 centimeters), a width of 9 inches (22.86 centimeters), and a height of 0.25 inches (0.635 centimeters). The top surface 29 of the board member 27 preferably has a first area 33 for receiving the antenna 21 and a second area 35 for receiving the access point 13. The board member 27 preferably has a plurality of openings or apertures 37 through the first area 33 for allowing the antenna 21 to be secured thereto using machine screws 39 and machine nuts 41 or the like. The board member 27 preferably has a plurality of openings or apertures 43 through the second area 35 for allowing the access point 13 to be secured thereto using machine screws or the like. The apertures 37, 43 may have a diameter of 0.125 inch (0.3175 centimeters).

The mounting system 11 includes a protective cover 45 for the antenna 21. The protective cover 45 is mounted to the top surface 29 of the board member 27 over the antenna 21. The protective cover 45, or radome, may be formed of a plastic material, such as ABS or PVC, in a general bowl or trough shape, with a wall thickness of about 0.068 inches (0.17272 centimeters), and secured, open face down, on the top surface 29 of the board member 27, over the antenna 21, with adhesive or the like. The protective cover 45 and top surface 29 of the board member 27 coact to define an internal space or cavity 47 of sufficient size to house the internal elements of the antenna 21, including any radio frequency elements, etc. The top of the protective cover 45 may have one or more apertures 49 for allowing the antenna coaxial cabling 23 to extend therethrough.

Figure 6:
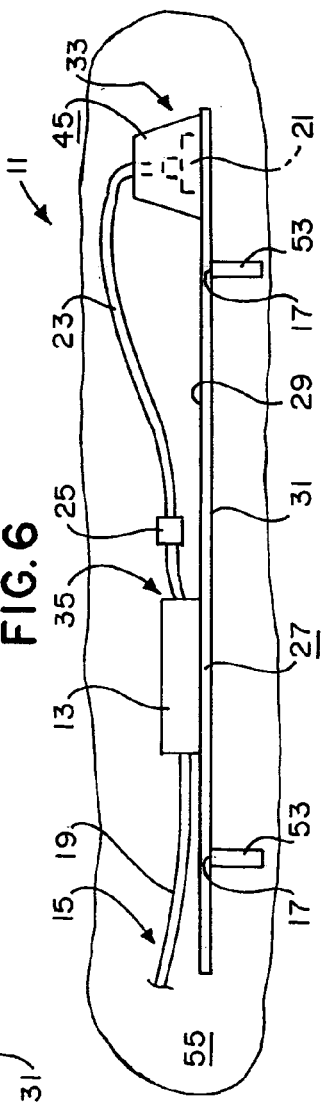
FIG. 6 is a side elevational view of the mounting system of the present invention combined with an access point transceiver and antenna of a wireless local area network communication system and placed on a wall mounting bracket.

The method for mounting and fine-tuning the coverage area of the access point 13 on the support surface 17 includes the steps of: providing the access point 13; providing the antenna 21; providing the freely movably board member 27; mounting the access point 13 to the top surface 29 of the board member 27; mounting the antenna 21 to the top surface 29 of the board member 27; providing the protective cover 45; mounting the protective cover 45 to the top surface 29 of the board member 27 over the antenna 21; providing the antenna coaxial cabling 23; connecting the antenna 21 to the access point 13 with the antenna coaxial cabling 23 and with the antenna coaxial cabling 23 extending through the protective cover 45; placing the board member 27 on the support surface 17; connecting the access point 13 to the coaxial input cabling 19 of the wireless local area network communication system 15; and then moving the board member 27 on the support surface 17 to fine-tune the area of coverage of the access point 13. As clearly shown in FIGS. 4 and 5, the support surface 17 may be the top of a suspended ceiling tile 51 or the like. Alternatively, as shown in FIG. 6, the support surface 17 may be wall brackets 53 attached to a wall 55 or the like.

Although the present invention has been described and illustrated with respect to a preferred embodiment and a preferred use therefor, it is not to be so limited since modifications and changes can be made therein which are within the full intended scope of the invention.

The invention claimed is:

1. A method for mounting and fine-tuning the coverage area of an access point transceiver of a wireless local area network communication system on a support surface, the wireless local area network communication system having coaxial input cabling, said method comprising the steps of:
    (a) providing an access point transceiver;
    (b) providing an antenna for said access point transceiver;
    (c) providing a freely movably board member having a top surface and a bottom surface;
    (d) mounting said access point transceiver to said top surface of said board member;
    (e) mounting said antenna to said top surface of said board member;
    (f) providing a protective cover for said antenna;
    (g) mounting said protective cover to said top surface of said board member over said antenna;
    (h) providing antenna coaxial cabling for joining said access point transceiver and said antenna;
    (i) connecting said antenna to said access point transceiver with said antenna coaxial cabling and with said antenna coaxial cabling extending through said protective cover;
    (j) placing said board member on the support surface;
    (k) connecting said access point transceiver to the coaxial input cabling of the wireless local area network communication system; and
    (l) moving said board member on the support surface to fine-tune the area of coverage of said access point transceiver.

* * * * *